United States Patent
Imes et al.

(10) Patent No.: US 6,305,054 B1
(45) Date of Patent: Oct. 23, 2001

(54) EXHAUST SYSTEM CLAMP

(75) Inventors: Julian A. Imes, Bloomington; John T. Herman, Dellwood; Wayne M. Wagner, Apple Valley, all of MN (US); James P. Shields, Fairbank, IA (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 09/346,976

(22) Filed: Jul. 2, 1999

(51) Int. Cl.[7] .......................... B65D 63/00; B65D 45/37
(52) U.S. Cl. ........................ 24/276; 24/279; 411/410
(58) Field of Search ................. 24/276, 279; 411/410, 411/411; 285/410

(56) References Cited

U.S. PATENT DOCUMENTS

| | | | |
|---|---|---|---|
| 1,243,748 | 10/1917 | McMurtrie | 285/154.3 |
| 1,252,637 * | 1/1918 | Westcott | 24/276 |
| 1,270,927 | 7/1918 | Clancy | 24/279 |
| 1,418,990 | 6/1922 | Thomas, Jr. | 560/45 |
| 1,510,934 | 10/1924 | Grant | 401/88 |
| 1,678,622 | 7/1928 | Horne | 24/483 |
| 2,009,744 | 7/1935 | Pfefferle | 277/623 |
| 2,093,210 | 9/1937 | Powell | 24/276 |
| 2,120,211 | 6/1938 | Cornell, Jr. | 285/373 |
| 2,270,375 | 1/1942 | King | 24/279 |
| 2,338,307 | 1/1944 | Staggers | 285/331 |
| 2,366,511 | 1/1945 | Frisk | 285/148.24 |
| 2,395,745 | 2/1946 | King | 285/367 |
| 2,417,741 | 3/1947 | Dillon | 285/373 |
| 2,456,048 | 12/1948 | Carpenter | 285/382 |
| 2,462,976 | 3/1949 | King | 24/276 |
| 2,502,156 * | 3/1950 | King | 24/276 |
| 2,543,185 | 2/1951 | Mathieu | 277/619 |
| 2,716,563 | 8/1955 | Seneschall | 285/364 |
| 2,821,768 | 2/1958 | Beckham et al. | 24/276 |
| 2,958,549 | 11/1960 | Spafford | 285/243 |
| 3,348,629 | 10/1967 | Cassel | 181/232 |
| 3,508,770 | 4/1970 | Cassel | 285/189 |
| 3,525,419 | 8/1970 | Cassel | 181/212 |
| 3,540,759 | 11/1970 | Schneider | 285/238 |
| 3,572,774 | 3/1971 | Sipler | 285/253 |
| 3,572,778 | 3/1971 | Cassel | 285/382 |
| 3,574,358 | 4/1971 | Cassel | 285/53 |
| 3,645,357 | 2/1972 | Cassel | 181/227 |

(List continued on next page.)

FOREIGN PATENT DOCUMENTS

| | | | |
|---|---|---|---|
| 0641214 * | 5/1962 | (CA) | 24/279 |
| 1037078 | 8/1978 | (CA). | |

OTHER PUBLICATIONS

Declaration of Wayne M. Wagner with Hand Sketch Page and 2 Photographs of Dynaflex clamp.

*Primary Examiner*—Victor N. Sakran
(74) *Attorney, Agent, or Firm*—Merchant & Gould P.C.

(57) ABSTRACT

The present disclosure relates to a clamp for sealing a lap joint formed by a first pipe inserted within a second pipe. The clamp includes a strap having a concave inner curvature that curves about a central axis. The strap includes a first axial end positioned opposite from a second axial end. A first axial portion of the strap is positioned at the first axial end, and a second axial portion of the strap is positioned at the second axial end. The first axial portion has a cylindrical inner surface adapted to provide a seal about the first pipe, and the second axial portion has a cylindrical inner surface adapted to form a seal about the second pipe. A radial in-step connects the first and second axial portions. The radial in-step provides a diameter transition between an inner diameter $D_1$ of the first axial portion and an inner diameter $D_2$ of the second axial portion such that the inner diameter $D_1$ is larger than the inner diameter $D_2$. The clamp further includes a single fastener for tightening both the first and second axial portions at the lap joint.

21 Claims, 8 Drawing Sheets

U.S. PATENT DOCUMENTS

| | | | |
|---|---|---|---|
| 3,653,696 | 4/1972 | Cassel | 285/403 |
| 3,730,293 | 5/1973 | Cassel | 181/227 |
| 3,863,964 | 2/1975 | Cassel | 285/382 |
| 3,905,623 | 9/1975 | Cassel | 285/382 |
| 3,944,265 | 3/1976 | Hiemstra et al. | 285/419 |
| 4,049,295 | 9/1977 | Piers | 285/9.1 |
| 4,056,273 | 11/1977 | Cassel | 285/337 |
| 4,109,350 | 8/1978 | Acre | 403/338 |
| 4,113,289 | 9/1978 | Wagner et al. | 285/322 |
| 4,176,865 | 12/1979 | Felton et al. | 285/373 |
| 4,261,600 | 4/1981 | Cassel | 285/148.26 |
| 4,270,689 | 6/1981 | Canfield | 228/152 |
| 4,312,526 | 1/1982 | Cassel | 285/419 |
| 4,463,975 | 8/1984 | McCord | 285/419 |
| 4,558,891 | 12/1985 | Wagner et al. | 285/322 |
| 4,623,164 | 11/1986 | Cassel et al. | 285/124.106 |
| 4,629,226 | 12/1986 | Cassel et al. | 285/382 |
| 4,640,536 | 2/1987 | Printiss, Sr. et al. | 285/367 |
| 4,660,682 | 4/1987 | Luinstra et al. | 187/401 |
| 4,790,574 | 12/1988 | Wagner et al. | 285/419 |
| 4,813,718 | 3/1989 | Matter et al. | 285/373 |
| 4,813,720 | 3/1989 | Cassel | 285/419 |
| 4,953,899 | 9/1990 | Printiss, Sr. | 285/420 |
| 5,116,083 | 5/1992 | Gillingham et al. | 285/23 |
| 5,310,158 | 5/1994 | Cassel | 248/74.3 |
| 5,411,162 * | 5/1995 | Koziczowski et al. | 24/279 |
| 5,632,513 | 5/1997 | Cassel | 285/322 |
| 5,647,612 | 7/1997 | Yoshida et al. | 285/13 |
| 5,692,544 | 12/1997 | Friedrich et al. | 138/99 |
| 5,782,499 | 7/1998 | Gfrerer et al. | 285/23 |
| 6,000,104 * | 12/1999 | Mann | 24/279 |

\* cited by examiner

EXHAUST SYSTEM CLAMP

FIELD OF THE INVENTION

The present invention relates generally to clamps. More particularly, the present invention relates to clamps for use in vehicular exhaust systems.

BACKGROUND OF THE INVENTION

Automotive, truck and other vehicular exhaust systems typically include conduit for directing exhaust gas from an engine to a remote location. Such exhaust systems often include a muffler, catalytic converter, resonator, or a combination thereof for treating the exhaust gas before it is discharged to the atmosphere. To accommodate various design criteria, exhaust gas systems usually include several exhaust conduits, tubes, hoses or pipes of various shapes and lengths that are connected together to form a fluid path for the exhaust gas.

The most common way of interconnecting consecutive conduits is to utilize a lap joint. To make a lap joint, one end of a first conduit is inserted within an end of a second conduit. The conduits are then clamped at the region where the conduits overlap. A typical clamp functions to crush, crimp, or otherwise deform the outer conduit against the inner conduit. The ends of the outer conduit typically include a plurality of longitudinal slots spaced about its circumference to facilitate crimping or otherwise deforming the outer conduit against the inner conduit.

U.S. Pat. No. 2,825,421 discloses a lap joint that uses "open ended" crimping slots. Typical "open ended" slots are generally u-shaped and extend longitudinally inward from a tube end for a distance of about 1.0 to 3.0 inches. A problem with "open ended" slots is that the slots can be difficult to seal and sometimes allow water to enter into an exhaust system. To address the problems associated with "open ended" slots, "captured" slots have been developed. "Captured" slots, such as those disclosed in U.S. Pat. Nos. 4,629,226, 4,270,689 and 4,113,289, do not extend completely to the end of an exhaust tube, and include two longitudinally spaced-apart closed ends.

While "captured" slots provide some advantages over "open ended" slots, "open ended" slots are still desirable for some situations. For example, "open ended" slots can be useful when a pipe is required to be unclamped and removed from another pipe, and then later reclamped with the same pipe. "Open ended" slots are desirable in this type of situation because, as compared to "captured" slots, "open ended" slots are easier to spread open after having been previously clamped at a lap joint. The need to unclamp and reclamp lap joints is common in the large truck industry. For example, new trucks are commonly "piggybacked" on one another during transport from the factory to dealers. To comply with freeway overpass clearance requirements, it is often necessary in these situations to remove the vertical tailpipes on the piggybacked trucks during transport, and reinstall the tailpipes at the dealer location. "Open ended" slots are advantageous because they facilitate the removal of tailpipes for transport to the dealers, and also facilitate the reinstallation of the tailpipes. Re-usable clamps are advantageous for the same reasons.

A variety of clamps have been developed for use in association with lap joints. One common clamp is known as a guillotine or saddle-type clamp. This clamp includes a u-bolt which is mounted on a saddle. The unbolt includes a concave portion that opposes a corresponding concave portion of the saddle. The saddle and u-bolt are forced toward each other through the use of a pair of nuts that are threaded on the legs of the un-bolt. U.S. Pat. Nos. 2,719,345 and 4,270,689 disclose guillotine or saddle-type clamps configured as described above.

Strap clamps have also been developed for use in sealing lap joints. Strap clamps can be divided into two categories including (1) wide band clamps; and (2) narrow band clamps. Wide band clamps are commonly formed of a band of relatively thin, ductile metal having a width frequently greater than three inches. When used to seal a lap joint, a typical wide band clamp is stressed beyond its elastic limit to conform intimately with the outer surfaces of the pipes forming the lap joint. U.S. Pat. No. 3,944,265 discloses a wide band clamp as described above.

Narrow band clamps are frequently used to seal lap joints having "captured" slots and are commonly made from bands of metal having widths equal to or less than 1.5 inches. Narrow band clamps are typically substantially thicker than their wide band counterparts. This increased thickness is useful in providing sufficient clamping force to adequately crush "captured" slots. Due to the thickness of material used in narrow band clamps, narrow band clamps usually are not stressed beyond their elastic limit when used to seal a lap joint. Consequently, narrow band clamps are more readily reusable than wide band clamps.

SUMMARY OF THE INVENTION

One aspect of the present invention relates to a readily reusable clamp that is capable of effectively sealing "open ended" slots as well as "captured" slots. Another aspect of the present invention relates to a clamp that can seal a lap joint between a tailpipe and a muffler, and can also stabilize the tailpipe relative to the muffler. A further aspect of the present invention relates to a self-aligning clamp.

An additional aspect of the present invention relates to a clamp for sealing a lap joint formed by a first pipe inserted within a second pipe. The clamp includes a strap having a concave inner curvature that curves about a central axis. The strap includes a first axial end positioned opposite from a second axial end. A first strap portion is positioned at the first axial end, and a second strap portion is positioned at the second axial end. The first strap portion has an inner diameter $D_1$ that is larger than an inner diameter $D_2$ of the second strap portion. The first strap portion has a cylindrical inner surface adapted to provide a seal about the first pipe, while the second strap portion is adapted to directly mechanically grip the second pipe. The clamp further includes a fastener for tightening the strap about the lap joint. In certain embodiments, the strap is configured to not deform beyond its elastic limit of deformation when clamped about the lap joint. In other embodiments, the first strap portion is adapted to seal conventional take-up openings formed in the first pipe. In still other embodiments, the second strap portion includes a cylindrical inner sealing surface having an axial length that is at most one quarter of a total axial length of the strap. In still further embodiments, a single bolt is used to tighten both the first and second strap portions.

Still another aspect of the present invention relates to an exhaust system including a first exhaust pipe, and a second exhaust pipe. The second exhaust pipe has an end that is telescopically positioned within an end of the first exhaust pipe such that a lap joint is formed between the first and second pipes. The system also includes a clamp for sealing the lap joint. The clamp includes a strap having a concave inner curvature that extends about a central axis. The strap includes first and second axial portions. The first axial portion has an inner diameter that is larger than an inner diameter of the second axial portion. The first and second axial portions are connected by a radial in-step that extends circumferentially about the strap. A single fastener is used to clamp both the first and second axial portions. The clamp is mounted at the lap joint such that the radial in-step of the strap abuts against the end of the first exhaust pipe. As so positioned, the first axial portion is clamped against the first exhaust pipe and the second axial portion is clamped against the second exhaust pipe. The clamp is sized and shaped to seal the lap joint without requiring the strap to be stretched beyond an elastic limit of the strap. The clamp can also be sized such that the second axial portion applies a radial clamping force directly to the second exhaust pipe.

A further aspect of the present invention relates to a method for stabilizing a vehicle tailpipe relative to a muffler. The method includes telescopically inserting the tailpipe within an outlet pipe of the muffler to form a lap joint. The method also includes providing a clamp for sealing the lap joint. The clamp includes a strap having a concave inner curvature that curves about a central axis. The strap includes first and second strap portions. The first strap portion has an effective inner diameter that is larger than an effective inner diameter of the second strap portion. The method further includes positioning the clamp with the first strap portion surrounding the outlet pipe, and the second strap portion surrounding the tailpipe. With the clamp positioned at the lap joint, the clamp is tightened about the tailpipe and the outlet pipe. As the clamp is tightened, the second strap portion of the clamping structure grips the tailpipe with sufficient force to stabilize the tailpipe relative to the muffler. In this manner, the clamp is exclusively used to stabilize the tailpipe relative to the muffler.

A variety of advantages of the invention will be set forth in part in the description that follows, and in part will be apparent from the description, or may be learned by practicing the invention. It is to be understood that both the foregoing general description and the following detailed description are explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION

Reference will now be made in detail to various aspects of the present invention that are illustrated in the accompanying drawings. Wherever possible, the same reference numbers will be used throughout the drawings to refer to the same or like parts.

Figure 4:
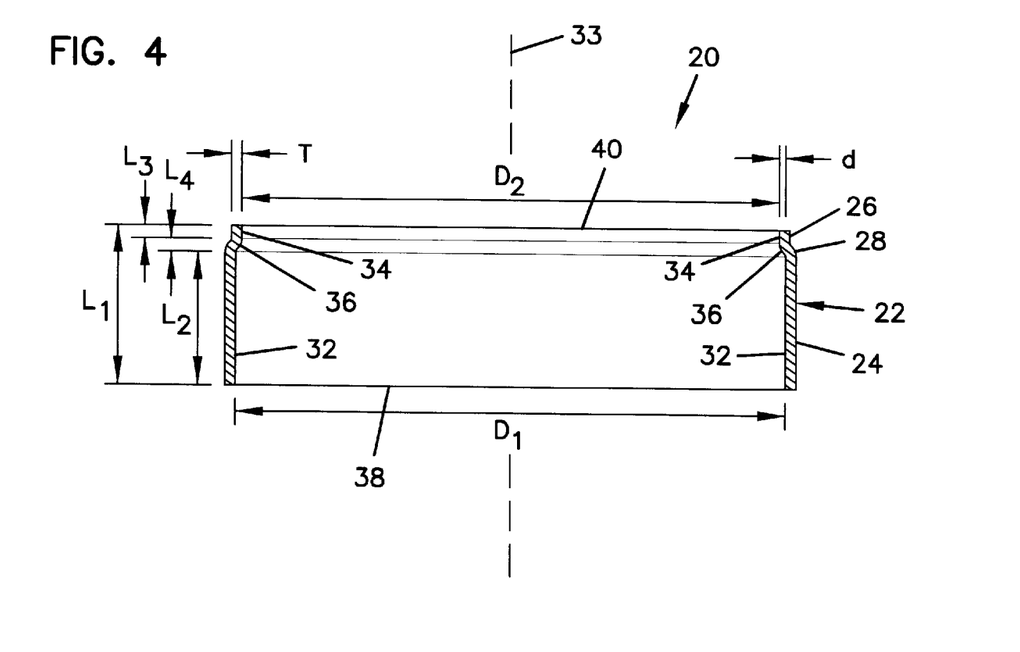
FIG. 4 is a cross-sectional view taken along section line 4—4 of FIG. 2.
Figure 5:
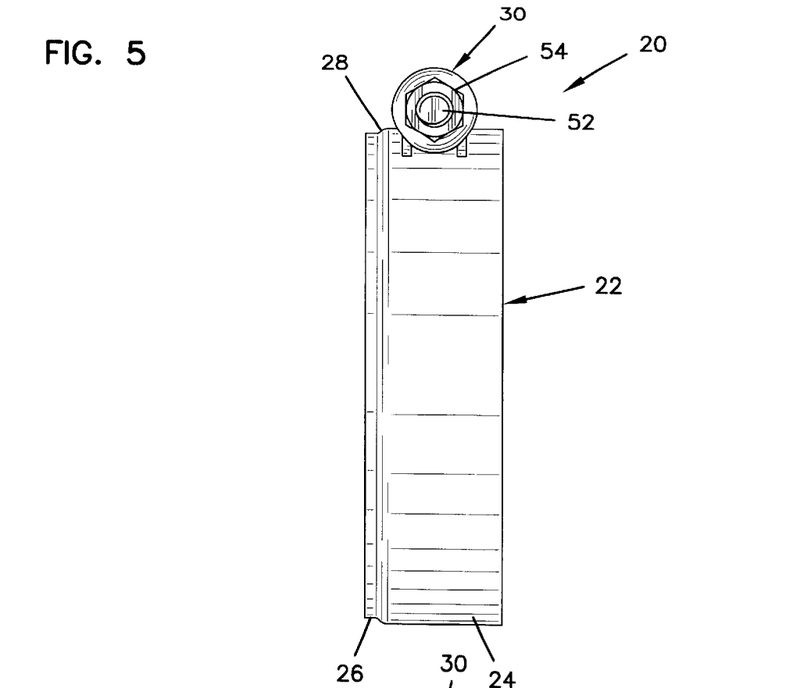
FIG. 5 is a right side view of the clamp of FIG. 2.
Figure 6:
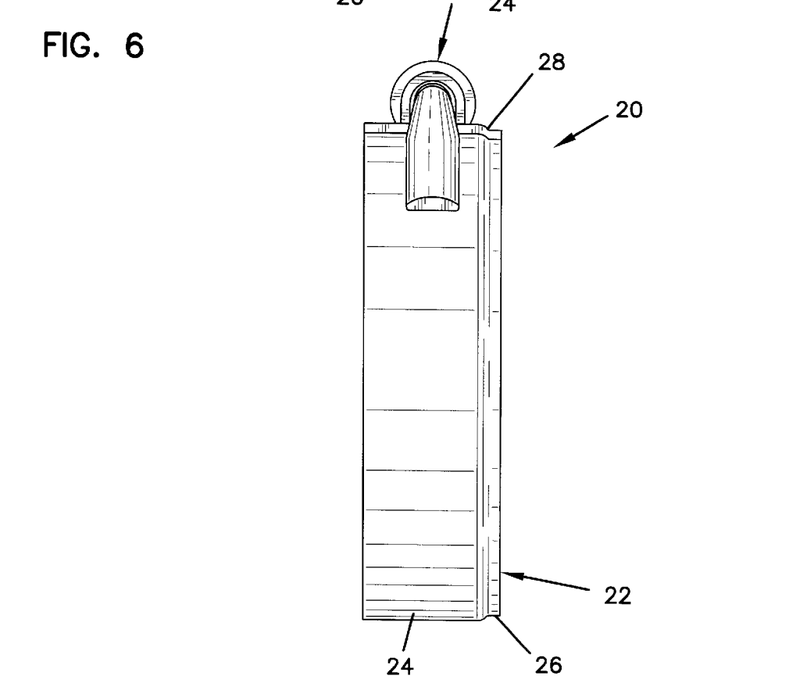
FIG. 6 is a left side view of the clamp of FIG. 2.

FIGS. 1–6 illustrate a clamp 20 constructed in accordance with the principles of the present invention. The clamp 20 includes a clamping structure in the form of a unitary, single piece strap 22. The strap 22 includes a first strap portion 24 and a second strap portion 26. The first and second strap portions 24 and 26 are interconnected by a radial in-step 28 that provides a diameter transition between the first and second strap portions 24 and 26. For example, as shown in FIG. 4, the first strap portion 24 has an inner diameter $D_1$ that is larger than an inner diameter $D_2$ of the second strap portion 26. The clamp 20 also includes a fastener 30 for use in tightening the clamp 20 about a pipe lap joint.

Figure 1:
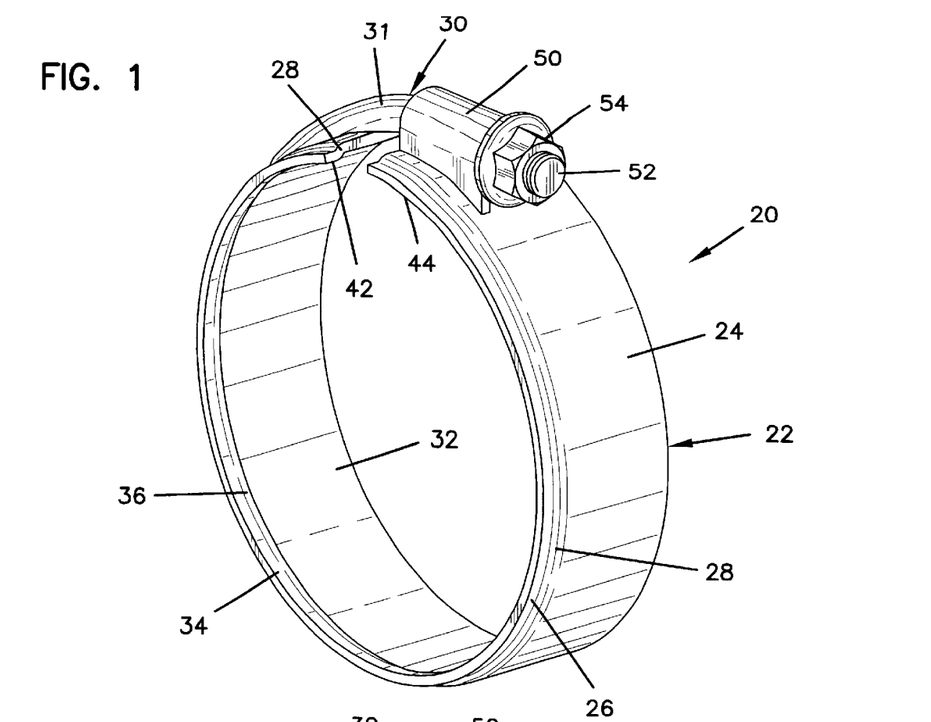
FIG. 1 is a perspective view of a clamp constructed in accordance with the principles of the present invention.
Figure 2:
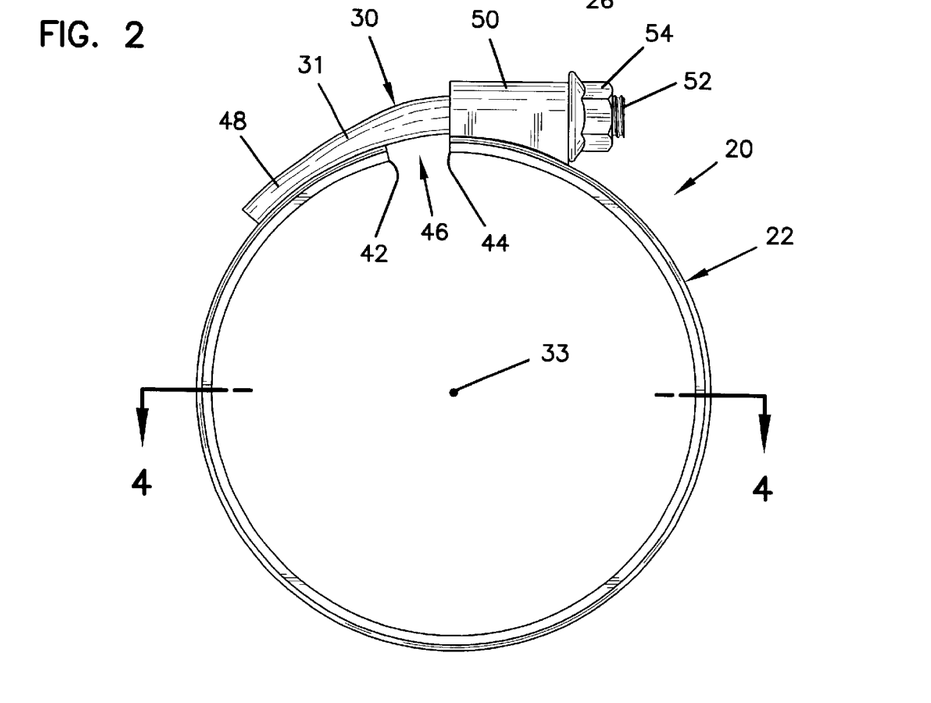
FIG. 2 is a front view of the clamp of FIG. 1.
Figure 3:
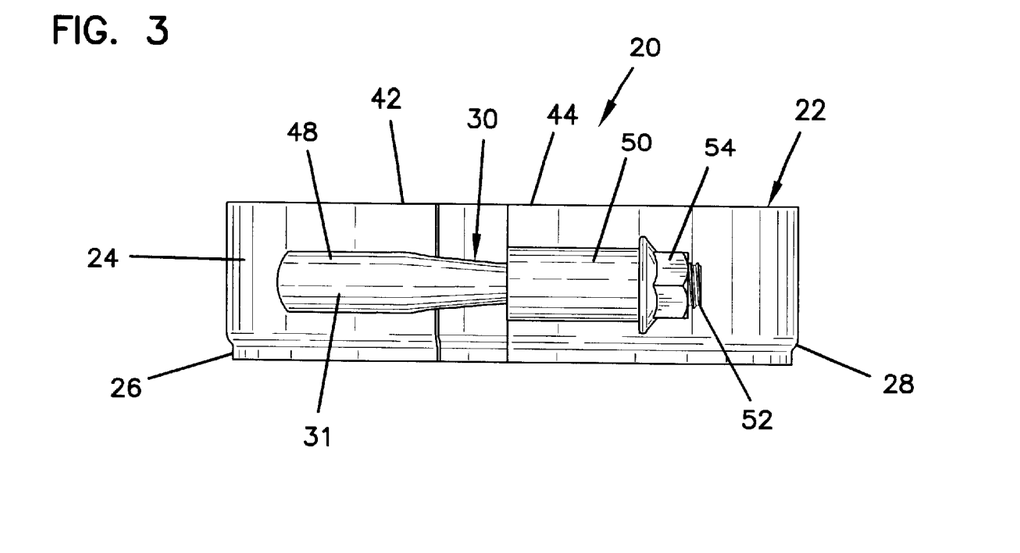
FIG. 3 is a top view of the clamp of FIG. 2.

The first strap portion 24 includes an inner, concave surface 32 that curves about a central axis 33 (shown in FIG. 2). Similarly, the second strap portion 26 includes an inner, concave surface 34 that curves about the central axis 33. The inner surfaces 32, 34 are each generally cylindrical. The inner surface 32 is adapted for forming a fluid-tight seal about a cylindrical outer surface of a first pipe of a lap joint, and the inner surface 34 is adapted for forming a fluid-tight seal about a second pipe inserted within the first pipe.

The concave surface 32 is connected to the concave surface 34 by a step surface 36 that extends circumferentially about the central axis 33. As shown in FIG. 4, the step surface 36 angles toward the central axis 33 as the step surface 36 extends from the inner surface 32 to the inner surface 34. In this manner, the step surface 36 provides a diameter transition between the first and second strap portions 24 and 26.

Referring to FIG. 4, in certain embodiments, the strap 22 has a total axial length $L_1$ that is less than 2 inches, or in the range of 1–1.5 inches. In certain other embodiments, the total axial length of $L_1$ is about 1.5 inches. The first strap portion 24 preferably has an axial length $L_2$ that is greater than a corresponding axial length $L_3$ of the second strap portion 26. The radial in-step 28 has an axial length $L_4$. In one particular embodiment, the length $L_2$ is about 1.25 inches, the length $L_3$ is about 0.125 inches, and the length $L_4$ is about 0.125 inches. In another embodiment, the length $L_2$ is less than or equal to 1.5 inches, the length $L_3$ is less than 0.25 inches, and the length $L_4$ is less than 0.25 inches. In a further embodiment, the length $L_2$ is in the range of 1.0–1.5 inches, the length $L_3$ is in the range of 0.25–0.125 inches, and the length $L_4$ is in the range of 0.25–0.125 inches.

Referring again to FIG. 4, the strap 22 includes a first axial end 38 positioned opposite from a second axial end 40. The first strap portion 24 is positioned at the first end 38 and the second strap portion 26 is positioned at the second end 40. As shown in FIG. 4, the in-step 28 is positioned adjacent the second axial end 40. Because the in-step 28 is positioned adjacent the second axial end 40, the length $L_3$ of the second strap portion 26 is substantially shorter than the length $L_2$ of the first strap portion 24. For example, in certain embodiments, the total axial length $L_1$ of the strap 22 is at least three times as large as the length $L_3$. In other embodiments of the present invention, the total axial length $L_1$ is at least four, six, eight or ten times as large the axial length $L_3$. In still another embodiment, the total axial length $L_1$ is about twelve times as large as the axial length $L_3$.

The strap 22 is preferably made of a material such as stainless steel or aluminized steel. Additionally, the strap 22 is preferably sufficiently thick to prevent the strap 22 from being deformed beyond its elastic limits when the strap 22 is used to seal a lap joint. In one particular embodiment, the strap 22 has a total axial length $L_1$ less than two inches, and a wall thickness T in the range of 0.065 to 0.105 inches.

Referring to FIG. 2, the strap 22 includes first and second longitudinal edges 42 and 44 between which a longitudinal gap 46 is formed. The fastener 30 of the clamp 20 includes a bent bolt 31 having a base end 48 that is fixedly connected (e.g., welded) to an outer convex surface of the first strap portion 24 on one side of the gap 46 (e.g., adjacent the first edge 42). A sleeve 50 is fixedly connected (e.g., welded) to the outer convex surface of the first strap portion 24 on the other side of the gap 46 (e.g., adjacent the second edge 44). The bent bolt 31 traverses the gap 46, and a threaded end 52 of the bent bolt 31 is inserted through the sleeve 50.

The base end 48 of the bent bolt 31 and the sleeve are curved to match the curvature of the outer circumference of the strap 22. The curved base end 48 of the bent bolt 31 traverses the gap 46 and extends partially into the sleeve 50. The threaded end 52 of the bent bolt 31 is straight. Within the sleeve 50, the bent bolt 31 transitions from the bent base end 48 to the straight threaded end 52. It will be appreciated that a similar bent-bolt type fastener is disclosed in U.S. Pat. No. 4,558,891 to Wagner et al., which is hereby incorporated by reference.

To tighten the clamp 20 about a lap joint, a nut 54 is threaded on the threaded end 52 of the bolt 31. As the nut 54 is threaded on the bolt 31, the nut 54 contacts the sleeve 50 causing the longitudinal edges 42 and 44 of the strap 22 to be drawn together thereby closing the gap 46 and constricting the inner diameters $D_1$ and $D_2$ of the strap 22. The sleeve and the bent bolt 31 are preferably configured such that when the fastener 30 is tightened, an effective line of force for closing the gap 46 passes across the strap 22 generally tangential to the gap 46.

Referring now to FIGS. 3–6, the fastener 30 is mounted at a mid-region the first strap portion 24 and no additional fastener is provided at the second strap portion 26. Instead, a single fastener (i.e., the bent bolt 31) is used to tighten both the first and second strap portions 24 and 26 of the strap 22. It will be appreciated that a variety of different size bolts could be used in practicing the present invention. For example, in one particular embodiment, a bolt with a 7/16 inch thread could be used. In another embodiment, a bolt with a 3/8 inch thread could be used.

Figure 9:
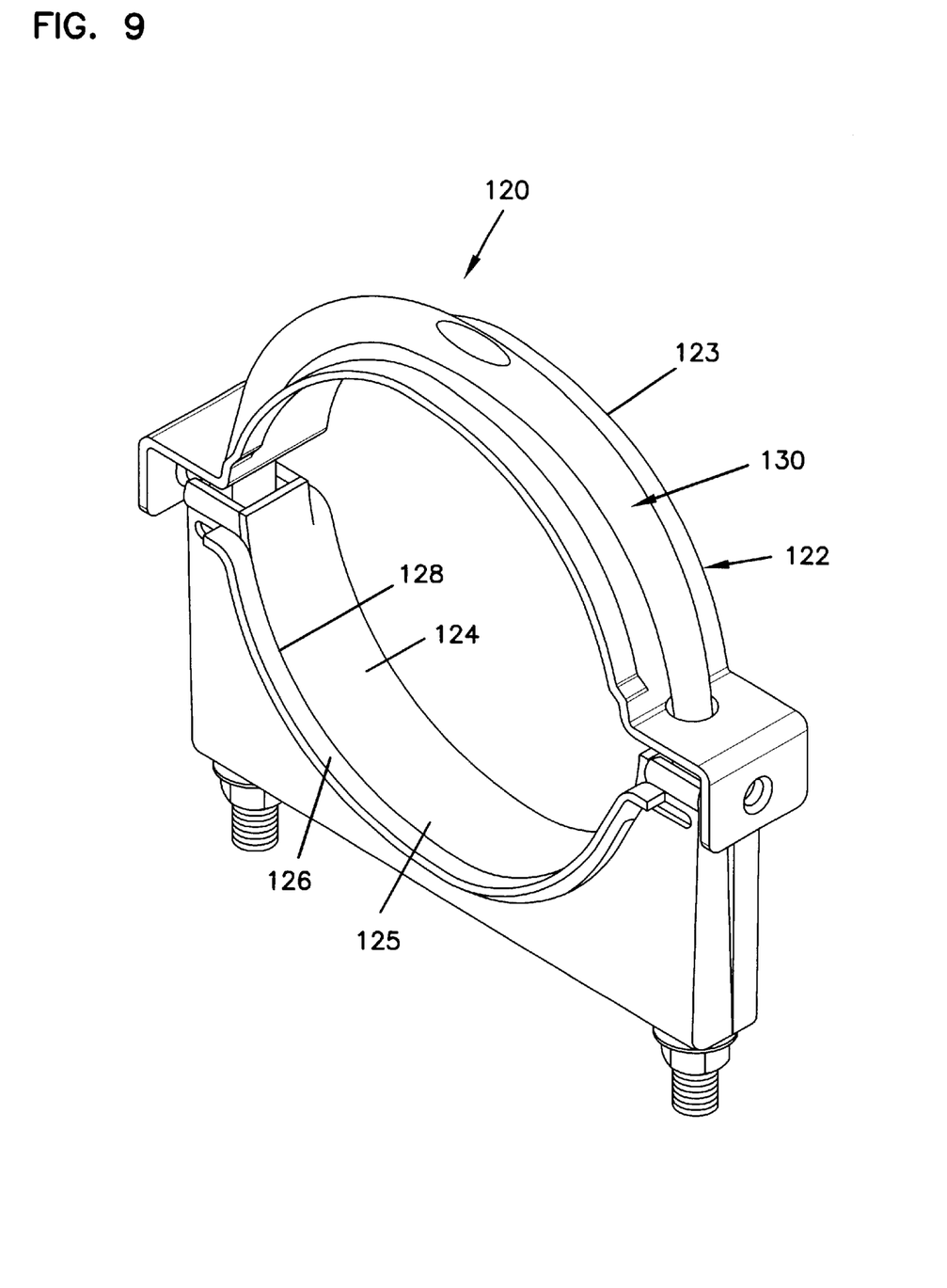
FIG. 9 is a perspective view of an alternative clamp constructed in accordance with the principles of the present invention.

While the embodiment of FIGS. 1–6 illustrates using a single fastener to tighten the clamp 20, it will be appreciated that any type of fastener for tightening a clamp could be used. For example, separate fasteners could be used at the two different diameter strap portions. Also, straight bolts (e.g., bolts extending through ears that project radially outward from a strap) could also be used. Furthermore, a multiple piece strap (e.g., a two piece strap having two opposing, concave half pieces) having axial portions with different diameters, as shown in FIG. 9, could also be used.

The step 28 of the strap 22 is preferably a "pre-clamped step." The term "pre-clamped step" is intended to mean than the step 28 is formed in the strap 22 prior to the strap ever being clamped at a lap joint. It will be appreciated that the "pre-clamped step" can be manufactured in a variety of ways. For example, the strap 22 can be made by providing a flat strip, cutting the flat strip a desired length, pressing the step 28 into the strip with a die, and then rolling the strip into the generally circular configuration of FIGS. 1 and 2 with a roller. Preferably, the roller is stepped to prevent the step 28 from being flattened during the rolling process. Alternatively, the step can be formed in a strip by a form rolling processes. Thereafter, the stepped strip can be cut into individual pieces of a desired length, and each of the pieces can be rolled into a circular configuration using a stepped roller.

Figure 7:
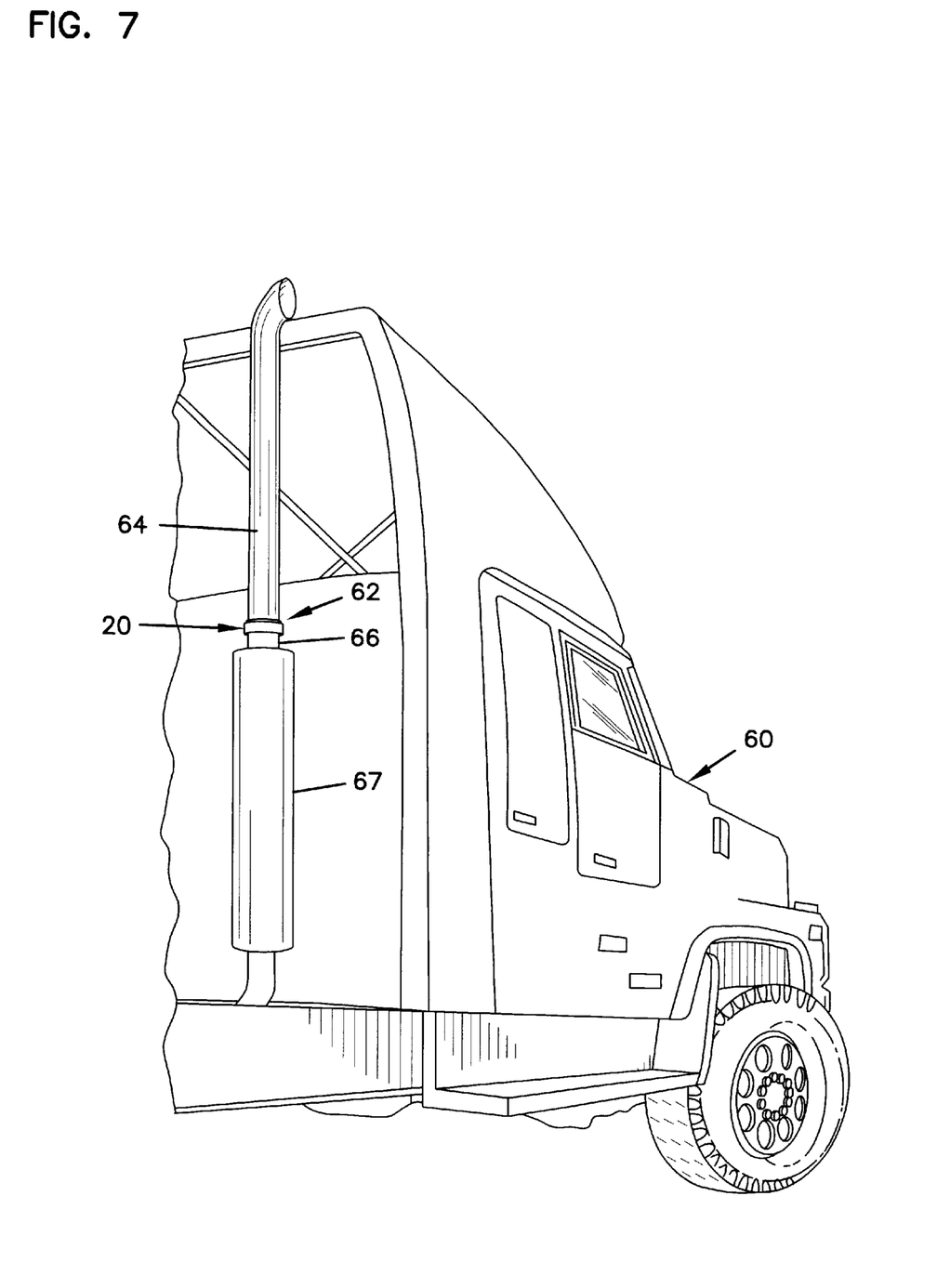
FIG. 7 illustrates the clamp of FIGS. 1–6 being used to secure a vertical tailpipe to a vertical muffler of a truck.
Figure 8:
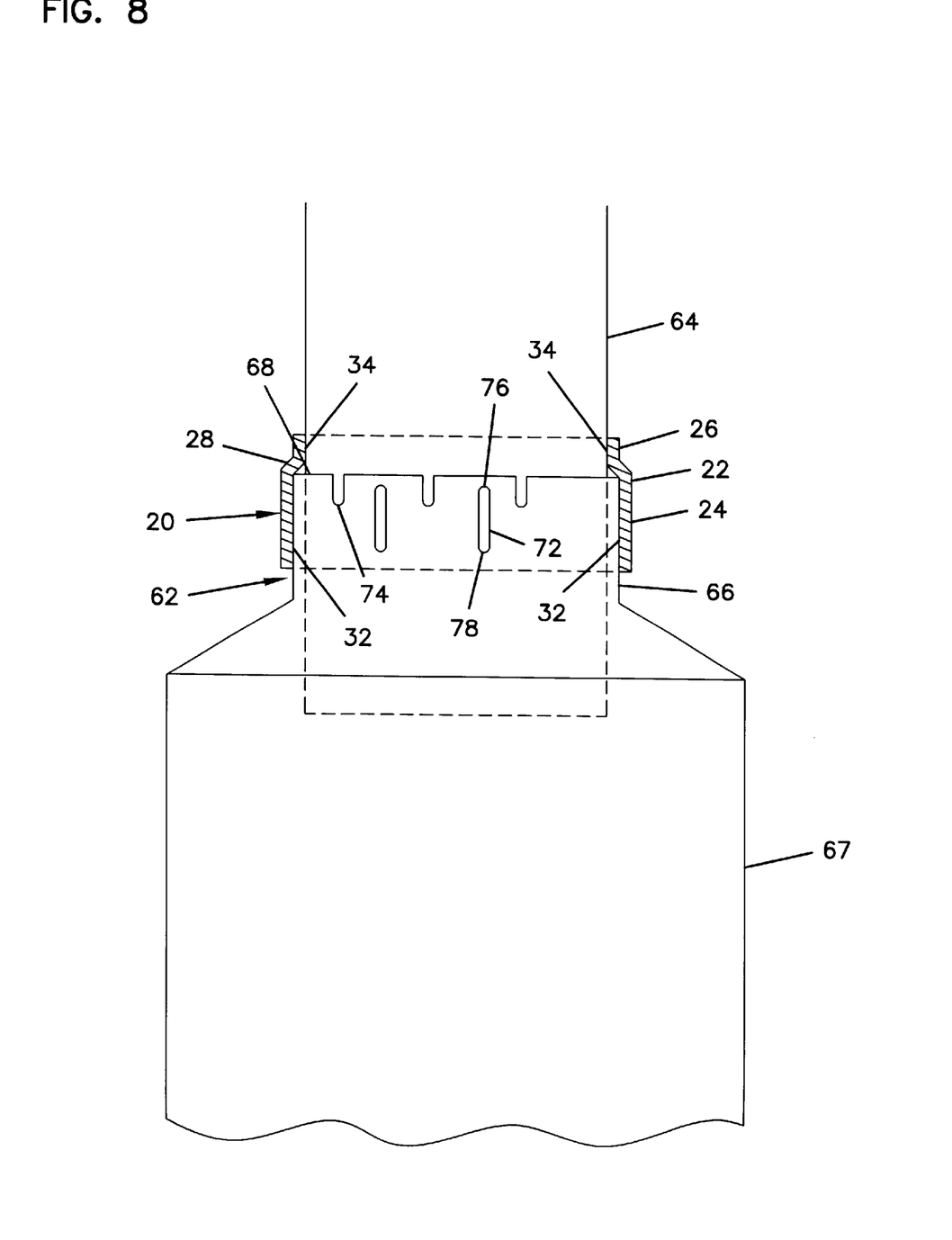
FIG. 8 is an enlarged view of the connection between the muffler and the tailpipe of FIG. 7.

FIG. 7 illustrates the clamp 20 installed on the exhaust system of a truck 60. For example, the clamp 20 is shown sealing a lap joint 62 formed between a vertical tailpipe 64 and an outlet pipe 66 of a vertical muffler 67. As shown in FIG. 8, the lower end of the tailpipe 64 is telescopically positioned within an upper end of the outlet pipe 66 to form the lap joint 62. The clamp 20 is mounted at the lap joint 62 such that the radial in-step 28 abuts against a top end surface 68 of the outlet pipe 66. With the in-step 28 so positioned, the first strap portion 24 is positioned around the outlet pipe 66 and the second strap portion 26 is positioned around the tailpipe 64. By tightening the fastener 30, the first strap portion 24 clamps against the outlet pipe 66 and the second strap portion clamps against the tailpipe 64. When tightened, the inner surface 32 of the first strap portion 24 forms a fluid-tight seal around the cylindrical outer surface of the outlet pipe 66, and the inner surface 34 of the second strap portion 26 forms a fluid-tight seal around the cylindrical outer surface of the tailpipe 64.

The clamp 20 is sized and shaped to seal the lap joint 62 without requiring the strap 22 to be stretched beyond its elastic limit. For example, if the tailpipe 64 has an outside diameter of 5.00 inches and is made of 16 gauge (0.06 inches) aluminized steel, and the outlet pipe 66 has an inside diameter of 5.03 inches and is made of 18 gauge (0.048 inches) aluminized steel, it is preferred for the strap 22 to have a thickness of 0.065 to 0.105 inches of aluminized steel, and for the total axial length $L_1$ of the strap to be about 1.5 inches. In such an embodiment, the clamped inside diameter $D_1$ is preferably about 5.08 inches, the clamped inside diameter $D_2$ is preferably about 4.96 inches, the axial length $L_2$ is preferably about 1.25 inches, and the axial length $L_3$ is preferably about 0.125 inches.

For a typical lap joint in a truck exhaust system, the tailpipe 64 is made of 16 gauge (0.06 inches) aluminized steel and the outlet pipe 66 is made of 18 gauge (0.048 inches) aluminized steel. To inhibit the strap 22 from deforming beyond its elastic limits during clamping, it is preferred for the strap to be at least as thick as the thickest pipe. Hence, the thickness T of the strap 22 is preferably at least 0.06 inches. In certain embodiments, the thickness T is at least as thick as the thickest pipe, and is also less than or equal to two times the thickness of the thickest pipe. For example, the strap 22 thickness T can be in the range of 0.06–0.12 inches. In the above embodiments, the strap 22 is preferably made of aluminized or stainless steel.

Referring again to FIG. 8, the outlet pipe 66 defines a plurality of take-up slots that assist in crimping the outlet pipe 66 against the tailpipe 64 to form the lap joint 62. As illustrated, the take-up slots include captured slots 72 and open ended slots 74. However, it will be appreciated that any type of slot configuration could be used and sealed because of the sealing function of the second strap portion 26.

One advantage of the invention is that the in-step 28 provides an alignment function. Specifically, the length $L_2$ of the first strap portion 24 is selected such that when the in-step 28 abuts against the top end surface 68 of the outlet pipe 66, the first strap portion 24 is sufficiently long to completely cover and seal the slots 72 and 74. It is common for captured slot 72 to be about 1 inch long and to have first ends 76 spaced about 0.16 inches from the top end of the outlet pipe 66, and second ends 78 positioned about 1.16 inches away from the top end of the outlet pipe 66. To properly seal the captured slots 72, it is preferred for the strap 22 to overlap the second ends 78 of the slots 72 by at least 0.09 inches. Therefore, it is preferred for the length $L_2$ of the first strap portion 24 to be about 1.25 inches.

Another advantage of the clamp 20 is that it can be used effectively with conventional "open ended" slots. The clamp 20 is suitable for use with conventional "open ended" slots because the in-step 28 and the second strap portion 26 cooperate to completely cover and seal the open ends of the slots. Therefore, water (e.g., rain water) is prevented from entering the exhaust system through the open ended slots, and exhaust gas is prevented from leaking as well.

To simplify the proper installation or reinstallation of tailpipes, it is desirable for the clamp 20 to be reusable and self positioning. In this regard, to form the lap joint 62, the tailpipe 64 is inserted within the outlet pipe 66. Next, the clamp 20 is slid down the tailpipe 64 until the radial in-step 28 abuts against the top end surface 68 of the outlet pipe 66. In sliding the clamp 20 down the tailpipe 64, the clamp 20 can either be inserted over the top of the tailpipe 64 after the tailpipe 64 has been inserted in the outlet pipe 66, or the clamp 20 can be placed on the tailpipe 64 before the lap joint 62 has been formed, and then slid downward after the lap joint 62 has been formed. Alternatively, the first axial portion 24 can be placed over the outlet pipe 66 with the radial in-step 28 seated on the top end 68 of the outlet pipe 66, and the tailpipe 64 can be slid through the clamp 20 and into the outlet pipe 66. Regardless of the technique used to position the clamp 20, the clamp is eventually oriented with the radial in-step 28 seated on the top end 68 of the outlet pipe 66. With the radial in-step 28 so oriented, the first axial portion 24 surrounds the outlet pipe 66 and the second axial portion 26 surrounds the tailpipe 64. Thereafter, the fastener 30 of the clamp 20 is tightened such that the first strap portion 24 of the clamp 20 crimps the outlet pipe 66 against the tailpipe 64. During tightening, gravity keeps the in-step portion 28 seated upon the top end surface 68 of the outlet pipe 66 such that the take-up slots 70 are completely covered by the first strap portion 24 of the strap 22. Consequently, the clamp 20 is self-positioning, and only one hand is needed to hold the clamp 20 while a tool (e.g., an impact wrench or a hand wrench) is used to tighten the fastener 30.

When the clamp 20 is tightened, the second strap portion 26 of the strap 22 directly mechanically grips the periphery of the tailpipe 64. Preferably, the second strap portion 26 grips the tailpipe 64 with sufficient force to stabilize the tailpipe relative to the muffler 67 such that no additional clamps are required to stabilize the tailpipe 64 relative to the muffler 67. A typical tailpipe required to be stabilized is at least 60 inches long, has an outer diameter of at least 4 inches, and weighs at least 15 lbs. Tailpipes that can be stabilized by the present invention are frequently 60–72 inches long, and frequently weigh about 3 lbs/foot. A common diameter range for tailpipes is 4–6 inches.

The use of a single clamp to both seal the lamp joint 62 and stabilize the tailpipe 64 relative to the muffler 67 provides numerous advantages over the prior art. For example, in prior art exhaust systems such as the system shown in U.S. Pat. No. 4,660,862, one clamp is used to seal the lap joint 62, while one or more additional clamps are used to stabilize the tailpipe 64. The use of a single clamp to perform both functions reduces clamp costs associated with the exhaust system, and also improves ease of installation.

As described above, it is common for vertical tailpipes such as the tailpipe 64 to be five feet or greater in length. Therefore, to ensure that adequate gripping force is provided to stabilize the tailpipe 64, it is preferred for the radial in-step 28 to have a radial dimension d (shown in FIG. 4) in the range of 5–90% greater than the thickness of the outlet pipe 66. More preferably, the radial dimension d of the radial in-step portion 28 is at least 10% greater than the thickness of the outlet pipe 66. Still more preferably, the radial dimension d of the in-step portion 28 is in the range of 10–50% greater than the thickness of the outlet pipe 66. By way of nonlimiting example, if the outlet pipe 66 is made of 18 gauge aluminized steel (0.048 inches), it is preferred for the radial dimension d of the in-step portion 28 to be in the range of 0.051 to 0.069 inches, or more preferably, to be about 0.06 inches. Additionally, it is significant that sufficient surface area of the second strap portion 26 of the strap 22 engage the tailpipe 64 to stabilize the tailpipe 64. To provide adequate gripping force, it is preferred for the length $L_3$ of the second strap portion 26 to be at least 0.125 inches.

While the clamp 20 has been described primarily as being used in association with the vertical lap joints, it will be appreciated that the clamp 20 could also be used for horizontal lap joints. Additionally, while numerous dimensions have been provided in this specification, it will be appreciated that these dimensions are illustrative, and that other dimensions may be used depending upon a particular application or pipe size. Moreover, while the clamp 20 has been described as being used primarily at lap joints between rigid or non-flexible pipe, the clamp 20 can also be used with flexible hoses or flexible pipes.

FIG. 9 illustrates another clamp 120 constructed in accordance with the principles of the present invention. The clamp 120 includes a 2-piece strap 122 including opposing, concave half pieces 123 and 125. The strap 122 includes a first strap portion 124 and a second strap portion 126. The first and second strap portions 124 and 126 are interconnected by a radial in-step portion 128 that provides a diameter transition between the first and second portions 124 and 126. The in-step portion 128 is configured such that the first strap portion 124 has a larger inner diameter than the second strap portion 126. Additionally, the first strap portion 124 has a longer axial length than the second strap portion 126. A u-bolt fastener 130 including a single bolt (e.g., a single u-bolt) is used to clamp the half-pieces 123 and 124 of the strap 122 together.

Figure 10:
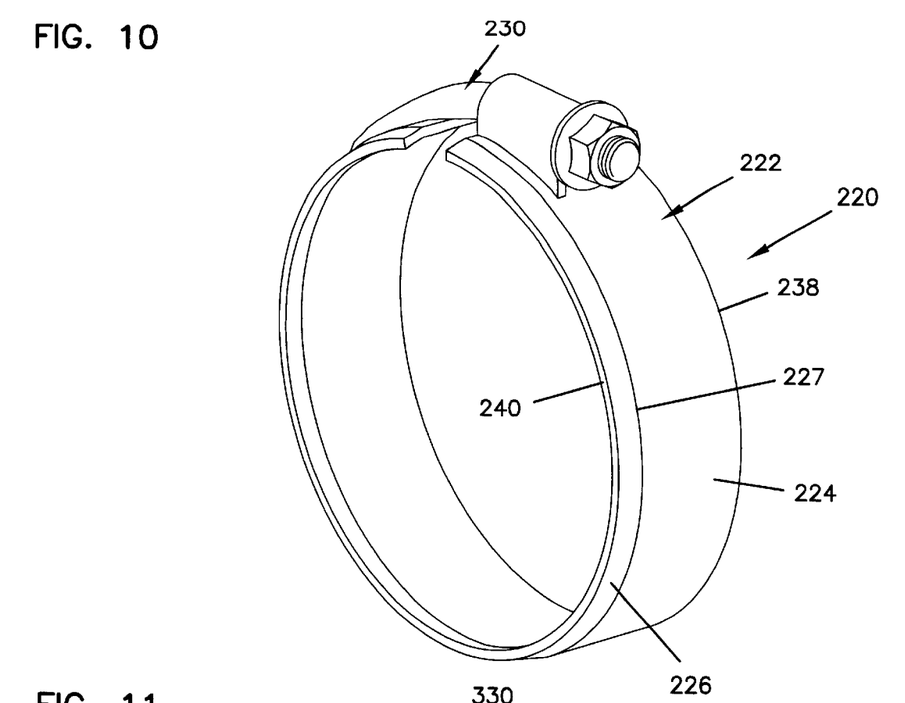
FIG. 10 is another clamp constructed in accordance with the principles of the present invention.

FIG. 10 illustrates another clamp 220 constructed in accordance with the principles of the present invention. The clamp 220 includes a strap 222 that is selectively tightened and untightened by a fastener 230. The strap 220 includes a first strap portion 224 and a second strap portion 226. The strap 222 also includes a first axial end 238 positioned opposite from a second axial end 240. The first strap portion 224 extends from the first axial end 238 to the second strap portion 226. The second strap portion 226 extends from the first strap portion 224 to the second axial end 240. The first strap portion 224 is generally tubular and has a constant inner diameter. The second strap portion 226 has a truncated cone shape such that a diameter of the second strap portion 226 continuously decreases as the second strap portion 226 extends from the first strap portion 224 toward the second axial end 240. The first strap portion 224 preferably has an axial length that is substantially longer than a corresponding axial length of the second strap portion 226.

In use of the clamp 220 at a lap joint such as the lap joint 62 of FIG. 7, the clamp 220 is preferably positioned such that an intersection region 227 between the first and second strap portions 224 and 226 aligns generally with the top end surface 68 of the outlet pipe 66. When the clamp 220 is tightened via the fastener 230, the first strap portion 224 crimps the outlet pipe 66 against the tailpipe 64 and seals the slots 72. Concurrently, the second strap portion 226 directly grips the periphery of the outlet pipe 66 thereby sealing the open ended slots 74 and mechanically stabilizing the tailpipe 64 relative to the muffler.

Figure 11:
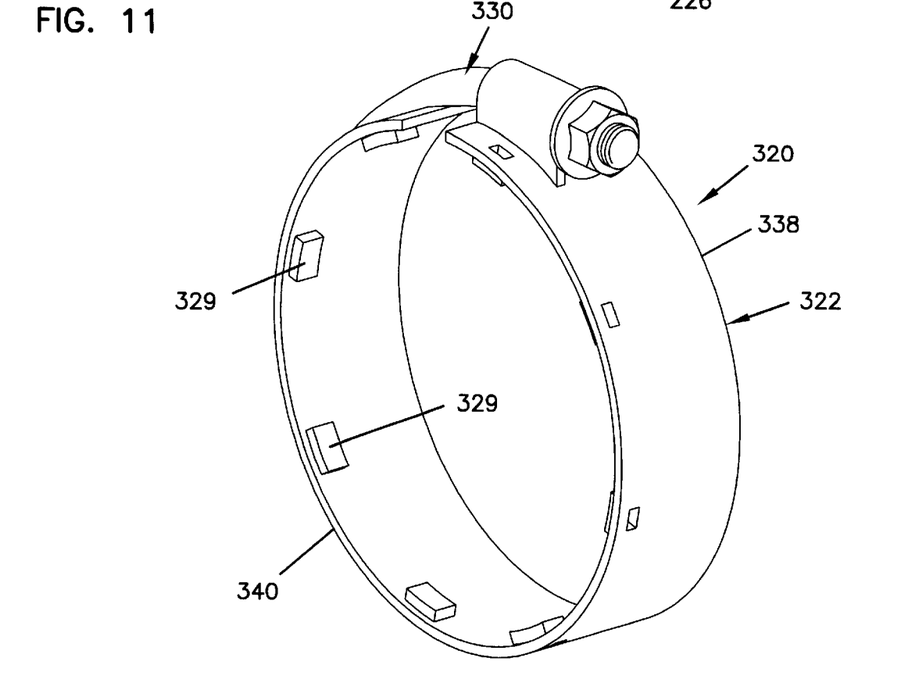
FIG. 11 is a further clamp constructed in accordance with the principles of the preset invention.

FIG. 11 illustrates a further clamp 320 constructed in accordance with the principles of the present invention. The clamp 320 includes a strap 322 that can be selectively tightened and loosened through the use of a fastener 330. The strap 322 includes oppositely positioned first and second axial ends 338 and 340. A plurality of radial projections 329 are positioned adjacent the second axial end 340. A first strap portion 324 is located adjacent to the first axial end 338. The first strap portion 324 defines an inner cylindrical sealing surface 332 adapted to cover conventional lap joint slots and to form a seal about a pipe. A second strap portion 326 is located adjacent the radial projections 329. The second strap portion 326 has an effective inner diameter that is smaller than an inner effective diameter defined by the first strap portion 324. The term "effective inner diameter" is intended to mean the diameter defined by the portions of the clamp 320 adapted to engage the outer surface of a pipe desired to be clamped. The projections 329 define radial in-steps that provide for the effective diameter variation.

To use the clamp 320 to seal a lap joint such as the lap joint 62, the clamp 320 is slid down the tailpipe 64 until the projections 329 abut against the stop end surface 68 of the outlet pipe 66. The fastener 330 is then tightened causing the strap 322 to crimp the outlet pipe 66 against the tailpipe 64 and to seal the slots 72 and 74. As the fastener 330 is tightened, the inward radial projections 329 directly clamp or grip the periphery of the tailpipe 64 to stabilize the tailpipe 64 relative to the muffler.

Figure 12:
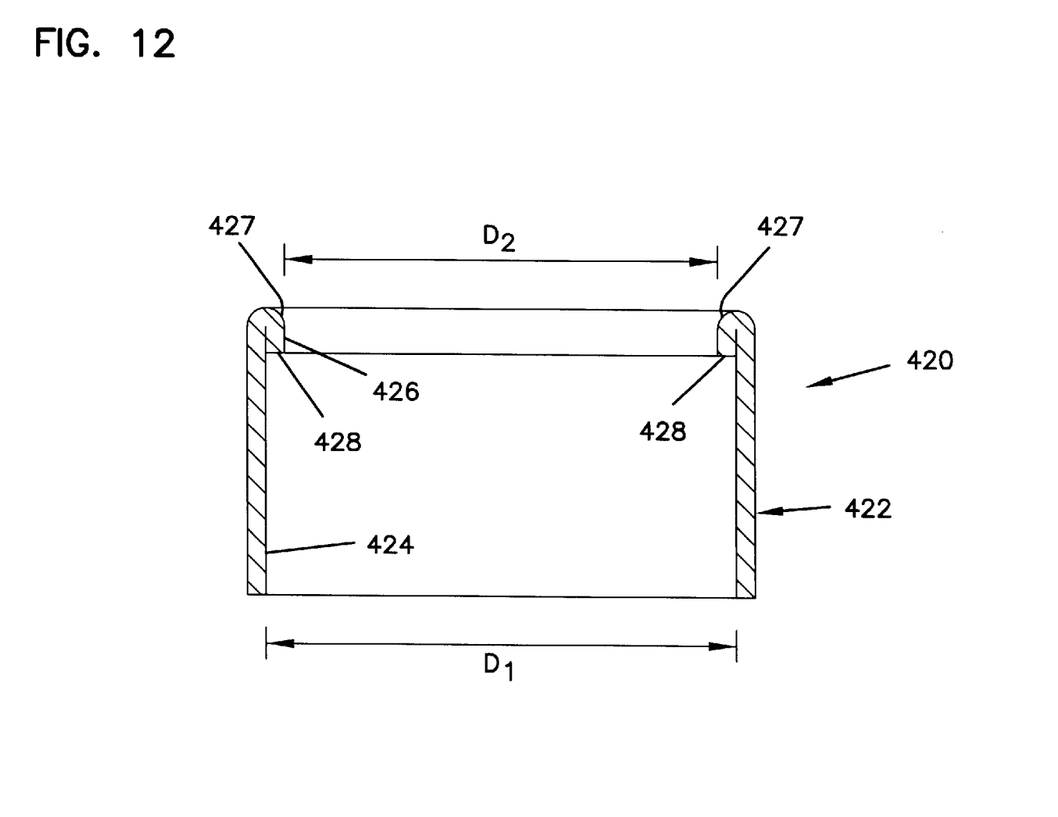
FIG. 12 is an additional clamp constructed in accordance with the principles of the present invention.

FIG. 12 illustrates an additional clamp 420 constructed in accordance with the principles of the present invention. The clamp 420 includes a strap 422 including a first strap portion 424 and a second strap portion 426. The first and second strap portions 424 and 426 are separated by a step 428. As shown in FIG. 12, the strap 420 has been axially bisected to show that the first strap portion 424 has a larger inner diameter $D_1$ than a corresponding inner diameter $D_2$ of the second strap portion 426. The reduction in diameter at the second strap portion 426 is provided by folding over an end portion of the strap 422 to form a double wall section 427. The end portion is folded into an interior region of the clamp 420. By varying the wall thickness of the end portion, the diameter difference between the first and second axial portions 424 and 426 can be varied. Similar to the other embodiments shown in this application, a variety of types of fasteners can be used to tighten or loosen the clamp 420.

With regard to the foregoing description, it is to be understood that changes may be made in detail, especially in matters of the construction materials employed and the size, shape and arrangement of the parts without departing from the scope of the present invention. It is intended that the specification and the depicted embodiments be considered illustrative only, with a true scope and spirit of the invention being indicated by the broad meaning of the following claims.

We claim:

1. A clamp for clamping a lap joint, the clamp comprising:
   A) a strap having a concave inner curvature that curves about a central axis, the strap including:
      i) a first axial end positioned opposite from a second axial end;
      ii) a first strap portion positioned at the first axial end, the first strap portion including a cylindrical inner surface defining an effective inner diameter $D_1$;
      iii) a second strap portion positioned at the second axial end, the second strap portion having an effective inner diameter $D_2$;
      iv) the effective inner diameter $D_1$ being larger than the effective inner diameter $D_2$;
   B) a single fastener for tightening the strap about the lap joint, the fastener including a single bolt for tightening both the first and second strap portions about the lap joint; and
   C) the second strap portion includes a cylindrical sealing surface defining the effective inner diameter $D_2$, wherein the effective inner diameter $D_1$ is substantially constant over an axial length of the first strap portion and the effective inner diameter $D_2$ is substantially constant over an axial length of the second strap portion, and wherein the first and second strap portions are interconnected by a circumferential radial in-step.

2. The clamp of claim 1, wherein the single bolt comprises a bent bolt.

3. The clamp of claim 1, wherein the strap has a total axial length that is at least four times as large as an axial length of the second strap portion.

4. The clamp of claim 3, wherein the single bolt is fixedly secured to the first strap portion.

5. The clamp of claim 1, wherein the strap has a total axial length that is at least four times as large as the axial length of the second strap portion.

6. The clamp of claim 5, wherein the fastener is mounted at the first strap portion.

7. The clamp of claim 6, wherein the fastener is fixedly mounted at the first strap portion.

8. The clamp of claim 7, wherein the fastener comprises a bent bolt.

9. The clamp of claim 6, wherein the total axial length of the strap is less than about 2 inches.

10. The clamp of claim 9, wherein the strap has a thickness of at least 0.06 inches.

11. The clamp of claim 6, wherein total axial length of the strap is at least eight times as large as the axial length of the second strap portion.

12. A clamp for clamping a lap joint, the clamp comprising:
   A) a strap having a concave inner curvature that curves about a central axis, the strap including:
      i) a first axial end positioned opposite from a second axial end;
      ii) a first strap portion positioned at the first axial end, the first strap portion including a cylindrical inner surface defining an effective inner diameter $D_1$;
      iii) a second strap portion positioned at the second axial end, the second strap portion having an effective inner diameter $D_2$;
      iv) the effective inner diameter $D_1$ being larger than the effective inner diameter $D_2$;
   B) a single fastener for tightening the strap about the lap joint, the fastener including a single bolt for tightening both the first and second strap portions about the lap joint;

(C) the strap includes opposing longitudinal edges that define a gap therebetween, wherein the first strap portion defines a convex outer surface, and wherein the single bolt is fixedly connected to the outer convex surface of the first strap portion and extends across the gap; and (D) the second strap portion includes a cylindrical sealing surface defining the effective inner diameter $D_2$, and wherein the first and second strap portions are interconnected by a radial in-step that extends from one of the longitudinal edges continuously around the circumference of the strap to the other of the longitudinal edges.

13. A clamp for sealing a lap joint formed by a first pipe positioned over a second pipe, the clamp comprising:

A) a strap having a concave inner curvature that curves about a central axis, the strap having a thickness of at least 0.06 inches and a total axial length less than 2 inches, and the strap including:

i) a first axial end positioned opposite from a second axial end;

ii) a first axial portion positioned at the first axial end, the first axial portion having a cylindrical inner surface adapted to provide a seal about the first pipe, and the first axial portion having a substantially constant inner diameter $D_1$;

iii) a second axial portion positioned at the second axial end, the second axial portion having a cylindrical inner surface adapted to form a seal about the second pipe, the second axial portion having a substantially constant inner diameter $D_2$;

iv) a radial in-step connecting the first and second axial portions, the radial in-step providing a diameter transition between the inner diameter $D_1$ and the inner diameter $D_2$ such that the inner diameter $D_1$ is larger than the inner diameter $D_2$; and B) a fastener for tightening the strap about the lap joint, the fastener including a bolt.

14. The clamp of claim 13, wherein the strap has a total axial length that is at least four times as large as an axial length of the second axial portion.

15. The clamp of claim 13, wherein the strap has a total axial length that is at least eight times as large as an axial length of the second axial portion.

16. The clamp of claim 13, wherein the strap has a total axial length of about 1.5 inches, the first axial portion has an axial length of about 1.25 inches, and the second axial portion has an axial length of about 0.125 inches.

17. The clamp of claim 13, wherein the strap includes multiple pieces.

18. The clamp of claim 13, wherein the thickness of the strap is in the range of 0.06–0.12 inches.

19. The clamp of claim 13, wherein the fastener comprises a single fastener including a single bolt secured to the strap for tightening both of the first and second axial portions, the single bolt being secured to the first axial portion of the strap.

20. The clamp of claim 19, wherein the single bolt comprises a bent bolt.

21. The clamp of claim 15, wherein the inner diameter $D_2$ of the second axial portion is reduced relative to the inner diameter $D_1$ of the first axial portion by a portion of the strap that is folded over.

* * * * *